United States Patent
Walczyk et al.

(10) Patent No.: US 7,686,216 B2
(45) Date of Patent: Mar. 30, 2010

(54) METHOD AND APPARATUS FOR UNIQUELY ASSOCIATING A BAR CODE READING TERMINAL TO A CASH REGISTER IN A RETAIL STORE NETWORK

(75) Inventors: Joseph Walczyk, Syracuse, NY (US); John C. Masters, Tully, NY (US); Barry H. Keys, Batavia, NY (US); Joseph Livingston, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 185 days.

(21) Appl. No.: 11/700,265

(22) Filed: Jan. 30, 2007

(65) Prior Publication Data

US 2007/0284441 A1    Dec. 13, 2007

Related U.S. Application Data

(60) Provisional application No. 60/813,310, filed on Jun. 13, 2006.

(51) Int. Cl.
*G06K 15/00*    (2006.01)
*G06K 7/10*    (2006.01)
*G06G 1/12*    (2006.01)

(52) U.S. Cl. ............. 235/383; 235/462.01; 235/462.14; 235/462.15; 235/462.46; 235/472.01; 235/472.02; 705/21

(58) Field of Classification Search ................ 235/383, 235/462.01, 462.14, 462.15, 462.46, 472.01, 235/472.02; 705/21
See application file for complete search history.

(56) References Cited

U.S. PATENT DOCUMENTS 3,826,900 A    7/1974   Moellering (Continued)

FOREIGN PATENT DOCUMENTS

GB     2324634 A    10/1998

(Continued)

OTHER PUBLICATIONS

Hand Held Products Imageteam 2020/5620 Cordless System, System Manual, 5620B-SM Rev. A Apr. 2005- 180 pages.

(Continued)

*Primary Examiner*—Thien M. Le
*Assistant Examiner*—Tuyen K Vo
(74) *Attorney, Agent, or Firm*—Marjama Muldoon Blasiak & Sullivan, LLP

(57) ABSTRACT

There is provided herein an encoded information reading terminal such as may be provided for by a bar code reading terminal for operation in a network such as a retail store network that is configured in one embodiment to automatically enter a unique association mode of operation subsequent to wirelessly receiving a radio address from one computer of a plurality of computers, e.g., a cash register address from one cash register out of a plurality of cash registers. In one embodiment a bar code reading terminal can be configured to wait for a cash register address to be wirelessly received as part of a connection request initiated from one cash register out of a plurality of cash registers. A bar code reading terminal can be configured so that when operating in a unique association mode, a bar code reading terminal transmits all decoded bar code messages output by the bar code reading terminal to an external device to the one cash register sending its cash register address.

34 Claims, 5 Drawing Sheets

U.S. PATENT DOCUMENTS

| | | |
|---|---|---|
| 4,251,798 A | 2/1981 | Swartz et al. |
| 4,369,361 A | 1/1983 | Swartz et al. |
| 4,387,297 A | 6/1983 | Swartz et al. |
| 4,409,470 A | 10/1983 | Shepard et al. |
| 4,523,139 A | 6/1985 | Schwarz et al. |
| 4,760,428 A | 7/1988 | Watanabe et al. |
| 4,850,009 A | 7/1989 | Zook et al. |
| 4,896,026 A | 1/1990 | Krichever et al. |
| 4,922,178 A | 5/1990 | Matuszewski et al. |
| 5,015,833 A | 5/1991 | Shepard et al. |
| 5,019,699 A | 5/1991 | Koenck |
| 5,052,943 A | 10/1991 | Davis |
| 5,059,778 A | 10/1991 | Zouzoulas et al. |
| 5,059,779 A | 10/1991 | Krichever et al. |
| 5,065,003 A | 11/1991 | Wakatsuki et al. |
| 5,124,539 A | 6/1992 | Krichever et al. |
| 5,132,523 A | 7/1992 | Bassett |
| 5,155,346 A | 10/1992 | Doing et al. |
| 5,189,291 A | 2/1993 | Siemiatkowski |
| 5,195,183 A | 3/1993 | Miller et al. |
| 5,198,650 A | 3/1993 | Wike, Jr. |
| 5,216,233 A | 6/1993 | Main et al. |
| 5,262,627 A | 11/1993 | Shepard |
| 5,313,053 A | 5/1994 | Koenck et al. |
| 5,317,691 A | 5/1994 | Traeger |
| 5,321,246 A | 6/1994 | Shepard et al. |
| 5,331,580 A | 7/1994 | Miller et al. |
| 5,406,063 A | 4/1995 | Jelen |
| 5,408,081 A | 4/1995 | Barkan |
| 5,408,382 A | 4/1995 | Schultz et al. |
| 5,459,389 A | 10/1995 | Fujiwara et al. |
| 5,466,170 A | 11/1995 | Pavek |
| 5,468,948 A | 11/1995 | Koenck et al. |
| 5,473,242 A | 12/1995 | McKenna |
| 5,475,206 A | 12/1995 | Reddersen et al. |
| 5,496,992 A | 3/1996 | Madan et al. |
| 5,504,316 A | 4/1996 | Bridgelall et al. |
| 5,521,370 A | 5/1996 | Hanson |
| 5,525,789 A | 6/1996 | Rockstein et al. |
| 5,544,010 A | 8/1996 | Schultz et al. |
| 5,557,093 A | 9/1996 | Knowles et al. |
| 5,591,953 A | 1/1997 | Rockstein et al. |
| 5,616,908 A | 4/1997 | Wilz et al. |
| 5,625,180 A | 4/1997 | Hanson et al. |
| 5,644,471 A | 7/1997 | Schultz et al. |
| 5,661,292 A | 8/1997 | Knowles et al. |
| 5,665,956 A | 9/1997 | La et al. |
| 5,694,318 A | 12/1997 | Miller et al. |
| 5,715,156 A | 2/1998 | Yilmaz et al. |
| 5,734,253 A | 3/1998 | Brake et al. |
| 5,767,501 A | 6/1998 | Schmidt et al. |
| 5,786,585 A | 7/1998 | Eastman et al. |
| 5,796,091 A | 8/1998 | Schmidt et al. |
| 5,808,285 A | 9/1998 | Rockstein et al. |
| 5,841,121 A | 11/1998 | Koenck |
| 5,844,227 A | 12/1998 | Schmidt et al. |
| 5,847,545 A | 12/1998 | Chen et al. |
| 5,861,615 A | 1/1999 | Bridgelall et al. |
| 5,874,722 A | 2/1999 | Rando et al. |
| 5,878,395 A | 3/1999 | Bennett |
| 5,883,375 A | 3/1999 | Knowles et al. |
| 5,888,087 A | 3/1999 | Hanson et al. |
| 5,889,268 A | 3/1999 | Swartz |
| 5,895,431 A | 4/1999 | Miller et al. |
| 5,928,292 A | 7/1999 | Miller et al. |
| 5,939,701 A | 8/1999 | Rockstein et al. |
| 5,942,743 A | 8/1999 | Schmidt et al. |
| 5,959,660 A | 9/1999 | Levan |
| 5,961,337 A | 10/1999 | Kordes |
| 5,978,569 A | 11/1999 | Traeger |
| 5,992,747 A | 11/1999 | Katoh et al. |
| 6,000,619 A | 12/1999 | Reddersen et al. |
| 6,002,236 A | 12/1999 | Trant et al. |
| 6,002,946 A | 12/1999 | Reber et al. |
| 6,015,091 A | 1/2000 | Rockstein et al. |
| 6,042,414 A | 3/2000 | Kunert |
| 6,045,048 A | 4/2000 | Wilz, Sr. et al. |
| 6,053,413 A | 4/2000 | Swift et al. |
| 6,053,759 A | 4/2000 | Kunert |
| 6,065,676 A | 5/2000 | Ring et al. |
| 6,094,029 A | 7/2000 | Reynolds et al. |
| 6,098,877 A | 8/2000 | Barkan et al. |
| 6,104,162 A | 8/2000 | Sainsbury et al. |
| 6,123,265 A | 9/2000 | Schlieffers et al. |
| 6,134,125 A | 10/2000 | Wenzel |
| 6,137,260 A | 10/2000 | Wung et al. |
| 6,138,914 A | 10/2000 | Campo et al. |
| 6,149,063 A | 11/2000 | Reynolds et al. |
| 6,182,898 B1 | 2/2001 | Schmidt et al. |
| 6,193,161 B1 | 2/2001 | Sojka et al. |
| 6,216,951 B1 | 4/2001 | Swift et al. |
| 6,216,953 B1 | 4/2001 | Kumagai et al. |
| 6,236,486 B1 | 5/2001 | Nocker, IV |
| 6,244,510 B1 | 6/2001 | Ring et al. |
| 6,257,492 B1 | 7/2001 | Bressler et al. |
| 6,283,375 B1 | 9/2001 | Wilz, Sr. et al. |
| 6,286,760 B1 | 9/2001 | Schmidt et al. |
| 6,290,132 B1 | 9/2001 | Dickson et al. |
| 6,299,067 B1 | 10/2001 | Schmidt et al. |
| 6,308,887 B1 | 10/2001 | Korman et al. |
| 6,321,991 B1 | 11/2001 | Knowles |
| 6,328,215 B1 | 12/2001 | Dickson et al. |
| 6,338,434 B1 | 1/2002 | Wilz, Sr. et al. |
| 6,345,764 B1 | 2/2002 | Knowles |
| 6,375,074 B1 | 4/2002 | Dickson et al. |
| 6,375,078 B1 | 4/2002 | Russell et al. |
| 6,394,354 B1 | 5/2002 | Wilz, Sr. et al. |
| 6,410,931 B1 | 6/2002 | Dvorkis et al. |
| 6,412,699 B1 | 7/2002 | Russell et al. |
| 6,415,980 B1 | 7/2002 | Dickson et al. |
| 6,418,325 B1 | 7/2002 | Reber et al. |
| 6,422,466 B1 | 7/2002 | Dickson et al. |
| 6,429,008 B1 | 8/2002 | Copeland et al. |
| 6,439,462 B1 | 8/2002 | Dickson et al. |
| 6,453,173 B1 | 9/2002 | Reber et al. |
| 6,457,646 B1 | 10/2002 | Dickson et al. |
| 6,460,769 B1 | 10/2002 | Knowles et al. |
| 6,464,141 B2 | 10/2002 | Dickson et al. |
| 6,474,556 B2 | 11/2002 | Dickson et al. |
| 6,483,273 B1 | 11/2002 | Lee |
| 6,484,943 B1 | 11/2002 | Reber et al. |
| 6,510,997 B1 | 1/2003 | Wilz, Sr. et al. |
| 6,517,001 B1 | 2/2003 | Knowles et al. |
| 6,523,750 B1 | 2/2003 | Dickson et al. |
| 6,530,522 B1 | 3/2003 | Check et al. |
| 6,547,144 B1 | 4/2003 | Dickson et al. |
| 6,556,553 B1 | 4/2003 | Palmer et al. |
| 6,561,424 B1 | 5/2003 | Dickson et al. |
| 6,561,428 B2 | 5/2003 | Meier et al. |
| 6,568,595 B1 | 5/2003 | Russell et al. |
| 6,575,368 B1 | 6/2003 | Tamburrini et al. |
| 6,581,837 B1 | 6/2003 | Hattersley |
| 6,585,159 B1 | 7/2003 | Meier et al. |
| 6,595,420 B1 | 7/2003 | Wilz, Sr. et al. |
| 6,604,684 B1 | 8/2003 | Schmidt et al. |
| 6,607,134 B1 | 8/2003 | Bard et al. |
| 6,616,047 B2 | 9/2003 | Catan |
| 6,619,549 B2 | 9/2003 | Zhu et al. |
| 6,622,917 B1 | 9/2003 | Knowles |
| 6,641,046 B2 | 11/2003 | Durbin |
| 6,643,158 B2 | 11/2003 | McDonald et al. |
| 6,644,549 B1 | 11/2003 | Swartz |
| 6,650,560 B2 | 11/2003 | MacDonald et al. |
| 6,675,203 B1 | 1/2004 | Herrod et al. |

| | | |
|---|---|---|
| 6,681,994 B1 | 1/2004 | Koenck |
| 6,688,523 B1 | 2/2004 | Koenck |
| 6,688,527 B2 | 2/2004 | Knowles et al. |
| 6,719,201 B2 | 4/2004 | Tamburrini et al. |
| 6,732,929 B2 | 5/2004 | Good et al. |
| 6,732,933 B2 | 5/2004 | Waxelbaum |
| 6,742,709 B2 | 6/2004 | Blake et al. |
| 6,758,402 B1 | 7/2004 | Check et al. |
| 6,764,012 B2 | 7/2004 | Connolly et al. |
| 6,772,949 B2 | 8/2004 | Wilz, Sr. et al. |
| 6,783,071 B2 * | 8/2004 | Levine et al. .......... 235/462.13 |
| 6,783,075 B2 | 8/2004 | Wilz, Sr. et al. |
| 6,811,088 B2 | 11/2004 | Lanzaro et al. |
| 6,814,293 B2 | 11/2004 | Curry et al. |
| 6,827,273 B2 | 12/2004 | Wilz, Sr. et al. |
| 6,832,725 B2 | 12/2004 | Gardiner et al. |
| 6,837,436 B2 | 1/2005 | Swartz et al. |
| 6,840,449 B2 | 1/2005 | Check et al. |
| 6,860,427 B1 | 3/2005 | Schmidt et al. |
| 6,886,104 B1 | 4/2005 | McClurg et al. |
| 6,905,071 B2 | 6/2005 | Schmidt et al. |
| 6,910,632 B2 | 6/2005 | Koenck et al. |
| 6,959,865 B2 | 11/2005 | Walczyk et al. |
| 7,028,905 B2 | 4/2006 | Sato et al. |
| 7,051,940 B2 | 5/2006 | Tamburrini et al. |
| 7,055,747 B2 | 6/2006 | Havens et al. |
| 7,063,263 B2 | 6/2006 | Swartz et al. |
| 7,111,786 B2 * | 9/2006 | Schmidt et al. ......... 235/462.45 |
| 2004/0016812 A1 * | 1/2004 | Schmidt et al. ......... 235/462.31 |
| 2004/0203384 A1 * | 10/2004 | Sugikawa et al. .......... 455/41.2 |
| 2005/0005102 A1 | 1/2005 | Meggitt et al. |
| 2005/0039092 A1 | 2/2005 | Soule et al. |
| 2005/0040230 A1 | 2/2005 | Swartz et al. |
| 2005/0150959 A1 | 7/2005 | Izzo et al. |

FOREIGN PATENT DOCUMENTS

| | | |
|---|---|---|
| GB | 2345370 A | 7/2000 |
| JP | 2000515655 | 11/2000 |
| WO | WO 9427247 A1 | 11/1994 |
| WO | WO 9728512 A1 | 8/1997 |

OTHER PUBLICATIONS

Hand Held Products Imageteam 2020/5620 Cordless System, System Manual, 5620B-SM Rev. A, Oct. 2004- 168 pages.

Hand Held Products Imageteam 2020/4620 Area Imager Cordless System, System Manual, 4620-SM Rev. A, Jan. 2005- 220 pages.

Hand Held Products Imageteam 2020/4620 Area Imager Cordless System, System Manual, 4620B-SM Rev. A, Apr. 2005- 248 pages.

* cited by examiner

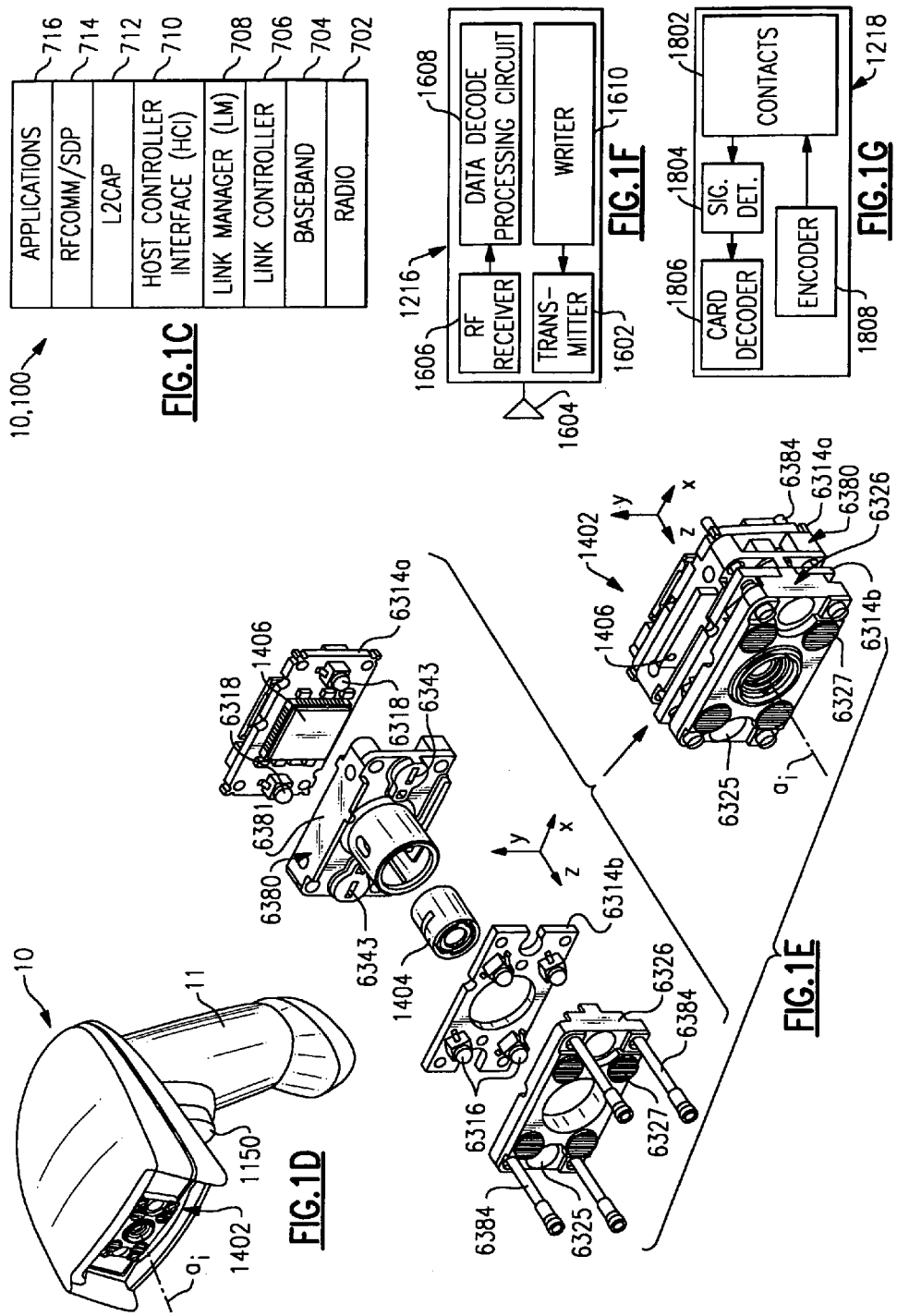

METHOD AND APPARATUS FOR UNIQUELY ASSOCIATING A BAR CODE READING TERMINAL TO A CASH REGISTER IN A RETAIL STORE NETWORK

This application claims priority under 35 U.S.C. §119(e) to Provisional Patent Application No. 60/813,310, entitled "Method And Apparatus For Uniquely Associating A Bar Code Reading Terminal To A Cash Register In A Retail Store Network" filed Jun. 13, 2006 which is incorporated herein by reference.

FIELD OF THE INVENTION

Background of the Invention

Mobile computers equipped with radio transceivers (e.g., Bluetooth or IEEE 802.11 radio transceivers) have operating modes wherein the mobile computer can automatically associate with a peer device, or, in the case of IEEE 802.11, an access point or a peer device (i.e., an ad hoc mode of operation). In such operating modes, which may be termed "free association" operating modes, a mobile computer senses that it is in range of a radio equipped computer device and a communication protocol commences to link a pair of radio transceiver equipped computers together, i.e., to form a wireless connection between the devices. For many applications, for example where local server or Internet access is required, such free association operating modes are desirable.

However, in certain other use cases, a free association between radio transceiver equipped computers is not desired. In some use cases it is desired that a mobile computer be able to link with only one out several possible radio transceiver equipped computers in an operating environment.

One operating environment wherein free association between radio transceiver equipped computers is not always desired is a retail store network wherein a mobile computer in the form of a hand held bar code reading terminal must be associated with one specific cash register including an associated radio transceiver. A radio transceiver of a cash register system may be provided, e.g., in a base station spaced apart from a cash register housing, a plug in radio transceiver in the form of a PC card, or a plug in radio transceiver pluggable into an external computer port (e.g., a USB plug). In a retail store network, it is required that one reading terminal be uniquely associated with a single cash register system so that product code information intended for processing by a first cash register is not erroneously associated with a retail transaction processed by a second cash register. Utilizing a free association operating mode in a retail store network would result in a single reading terminal attempting to connect or connecting with more than one cash register in range of the reading terminal.

DESCRIPTION OF THE DRAWINGS

The objects and features of the invention can be better understood with reference to the drawings described below, and the claims.

FIG. 1c is a layer diagram illustrating various software layers incorporated in a Bluetooth protocol stack.

FIG. 1d is a perspective view of a hand held terminal having a hand held housing and a manual trigger. The terminal shown in FIG. 1d can encapsulate and support an imaging module.

FIG. 1e is a perspective view of an imaging module which can be incorporated in a bar code reading terminal.

FIG. 1f is a block diagram illustrating exemplary components of an RFID reader unit.

FIG. 1g is a block diagram illustrating exemplary components of a card reader unit.

DETAILED DESCRIPTION OF THE INVENTION

There is provided herein, in one embodiment, a bar code reading terminal for operation in a retail store network that is configured in one embodiment to automatically enter a unique association mode of operation subsequent to wirelessly receiving a cash register address from one cash register out of a plurality of cash registers. In one embodiment a bar code reading terminal can be configured to wait for a cash register address to be wirelessly received as part of a connection request initiated from one cash register out of a plurality of cash registers. A bar code reading terminal can be configured so that when operating in a unique association mode, a bar code reading terminal transmits all successfully decoded bar code messages output by the bar code reading terminal to the one cash register sending its cash register address. A bar code reading terminal can further be configured so that prior to entering a unique association mode, the bar code reading terminal is prevented from wirelessly sending decoded out bar code messages to any radio equipped device in the retail store network. Further, a bar code reading terminal can be configured so that when operating in a unique association mode of operation, the bar code reading terminal is prevented from sending decoded out bar code message data to any other computer in the retail store network other than the cash register making the connection request. In such manner, the possibility of transaction data being corrupted by way of a bar code reading terminal sending a bar code decoded out message to a cash register other than one operating to carry out the current retail transaction is prevented.

Figure 1A:
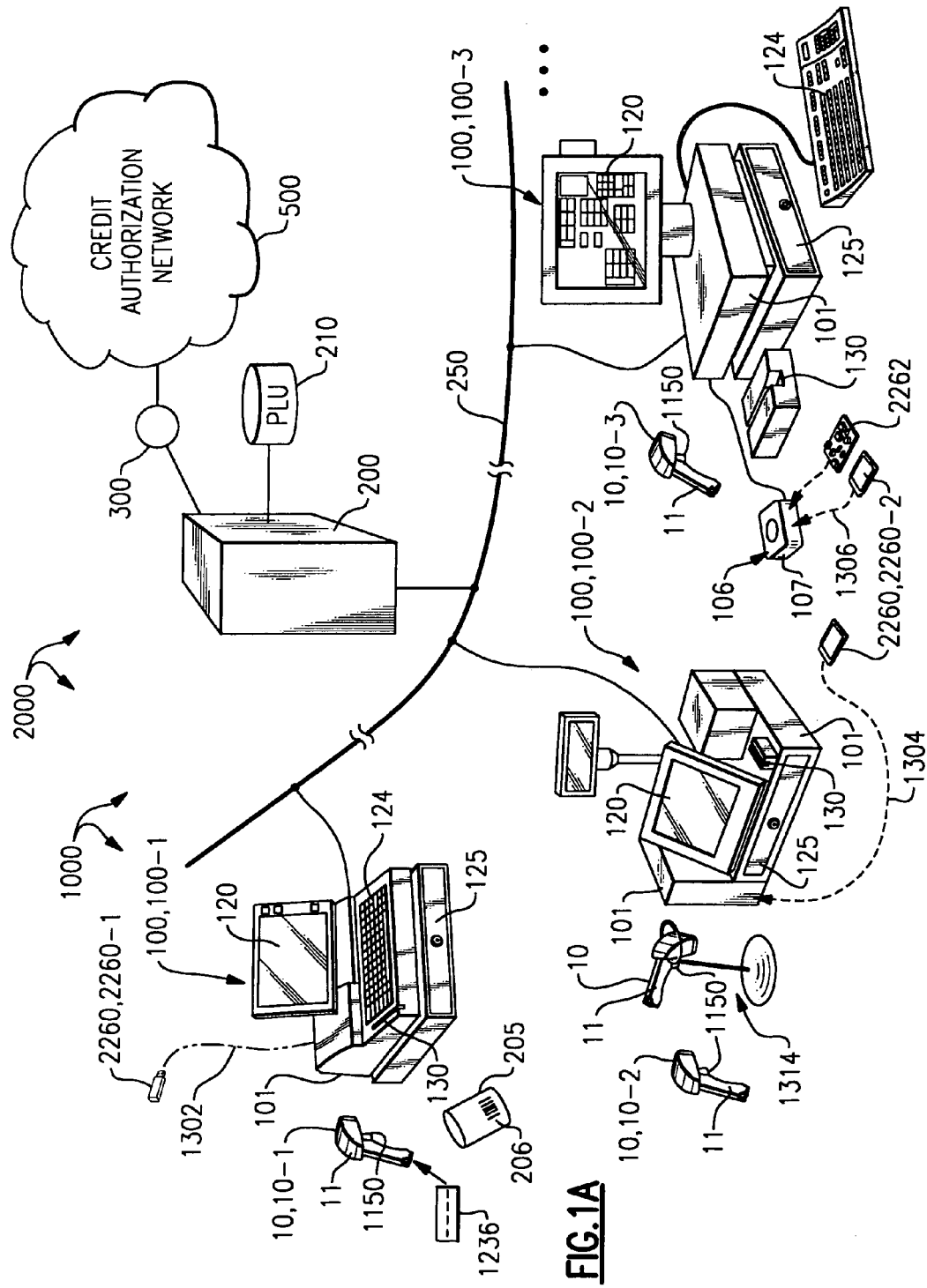
FIG. 1a is a diagram illustrating a system incorporating a retail store network. The retail store network includes a plurality of cash registers, a plurality of bar code reading terminals, a central server including a price lookup table and a credit authorization network.
Figure 1B:
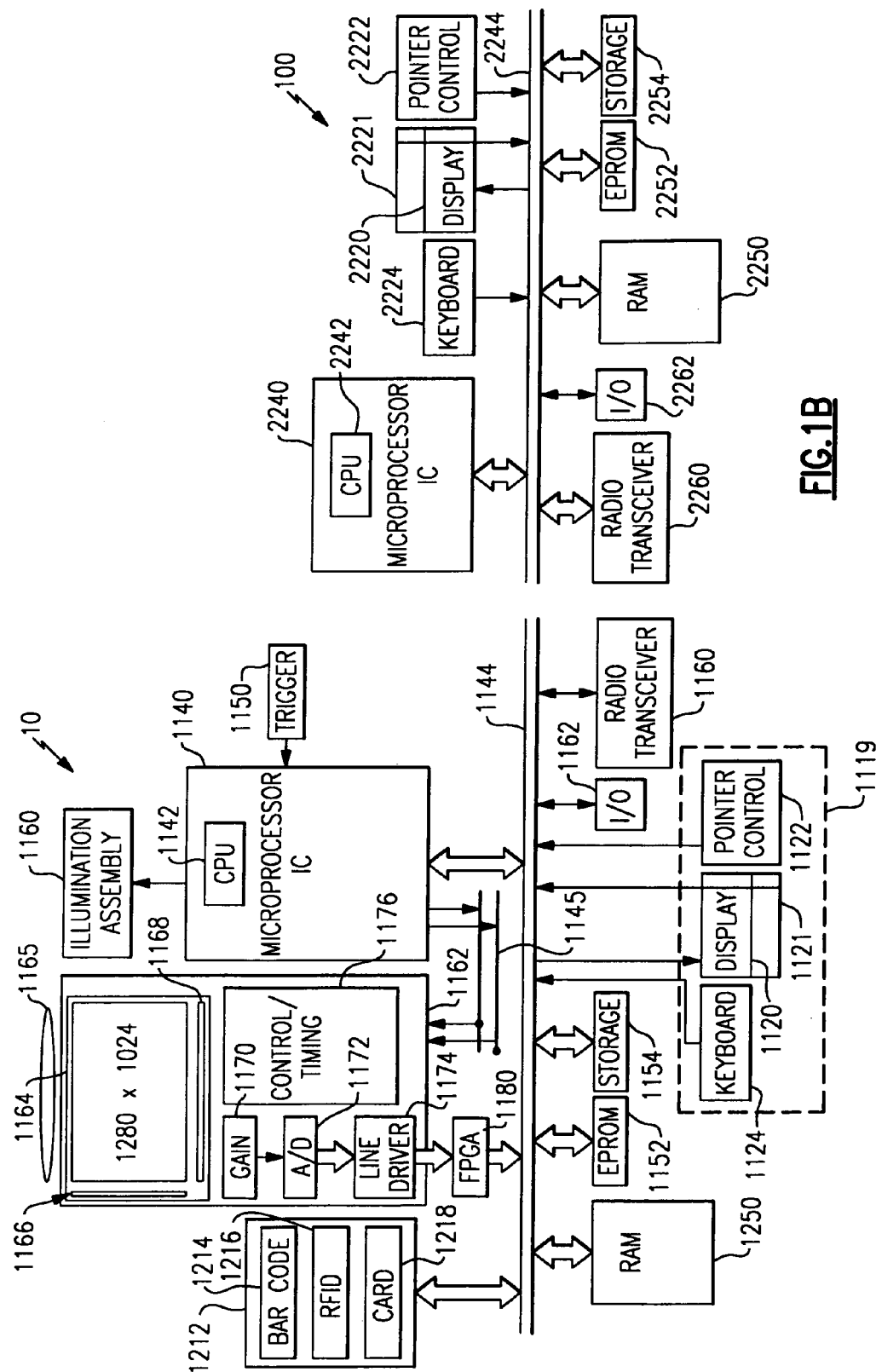
FIG. 1b is a block electrical diagram showing a bar code reading terminal in a cash register.

A system 2000 including a retail store network 1000 is shown in FIG. 1a. Retail store network 1000 can include a plurality of bar code reading terminals 10-1, 10-2, 10-3, a plurality of cash registers 100-1, 100-2, 100-3, and a central server 200. In one example, bar code reading terminal 10, 10-1 must be uniquely associated with cash register 100, 100-1, bar code reading terminal 10, 10-2 must be uniquely associated with cash register 100, 100-2, bar code reading terminal 10, 10-3 must be uniquely associated with cash register 100, 100-3, and bar code reading terminal 10, 10-4 disposed on presentation stand 1314 must be uniquely associated with cash register 100, 100-2. However, in another example there may be alternative examples (e.g., terminal 10-1 might be uniquely associated to cash register 100-3, etc.). The cash registers of retail store network 1000 can all be commonly provisioned. However, as is shown in the view of FIG. 1b, the cash registers can take on alternative forms. Regarding cash register 100, 100-1 a radio transceiver 2260, 2260-1 of cash register 100, 100-1 is in the form of a USB dongle Network Interface Card (NIC) plugged into the back of a main housing 101 as is indicated by arrow 1302. Regarding cash register 100, 100-2, a radio transceiver 2260, 2260-2 of cash register 100, 100-2 can be in the form of a PC card Network Interface Card (NIC) plugged into a bus internally disposed within main cash register housing 101 as is indicated by arrow 1304. Regarding cash register 100, 100-3 of FIG. 1a, a radio transceiver 2260, 2260-2 is again provided by a PC card NIC; however, NIC 2260-2 is disposed in base 106 of cash register 100, 100-3 as is indicated by arrow 1306. NIC 2260-2 can be plugged into a bus internally disposed with base housing 107. Base 106 can be spaced apart from main housing 101 of cash register 100-3. Base 106 can also incorporate a recharging circuit 2262 for recharging terminal 10. Recharging circuit 2262 may be a contact type charger or an inductive type charger, and may be a fast charger, a trickle charger or a charger that is selectively switchable between fast and trickle charging modes. Base 106 can be connected to main cash register housing 101 by way of a cable as shown, e.g., a USB cable or serial cable. Further, base 106 can include a socket 109 for receiving handle 12 of a bar code reading terminal 10 such as terminal 10-3. Cash registers 100-1, 100-2, 100-3 each have a display 120. A method for uniquely associating a bar code reading terminal to one specific cash register out of several cash registers can make use of a cash register display. In the environment shown, bar code reading terminals 10-1, 10-2, 10-3 may be low cost reading terminals that are devoid of displays. Further regarding cash register 100-3, cash register 100-3 can be configured so that tethered NIC 2260-2 operates as local hardware relative to the host microprocessor 2240 of cash register 100. For configuring NIC 2260-2 of cash register 100-3 to operate as local hardware, host control interface (HCI) software of cash register 100-3 can be partially distributed on microprocessor 2240 and partially distributed on NIC 2260-2 of the tethered base 106 of cash register 100-3. Radio transceivers 1160 of terminal 10 can be in the form of PC card NICs or other NIC configurations. Further details of a recharging circuit are described in U.S. patent application Ser. No. 11/168,230 filed Jun. 27, 2005 entitled, "Method and System For Linking A Wireless Hand Held Optical Reader With A Base Unit Or Other Wireless Device" incorporated herein by reference.

Referring to further aspects of system 2000, system 2000 further includes a store server 200 and a credit authorization network 500 connected to local store server 200 through a suitable gateway 300. Store server 200 can be in communication with cash registers 100-1, 100-2, 100-3 by way of backbone 250 such as may be provided by an Ethernet cable. Store server 200 incorporates a price lookup table (PLU) 210. Store server 200 is typically located locally on-site at a retail store while credit authorization network 500 is typically located off-site remote from a retail store. When a customer purchases an item 205 (e.g., a soup can), reading terminal 10, 10-1 is used to read a bar code 206 printed on the item. Decoded out message data is sent to store server 200 and is used to access a price from PLU 210. A price for the item is sent to cash register 100-1 which may associate the price with credit card data for the customer accessed by reading a credit card number with use of credit card reading terminal 130. Cash register 100-1 may send transaction data (including price and credit card data) to credit authorization network 500 for credit authorization. Network 500, if a transaction is approved, credits and debits appropriate account databases and returns a credit approved message to cash register 100-1. It can be seen with reference to retail store network 1000 that if bar code reading terminals 10-1, 10-2, and 10-3 had the capacity to freely associate with any of cash registers 100-1, 100-2, 100-3, then considerable errors in the collection of transaction data would likely ensue. For example, if bar code reading terminal 10-1 were able to freely associate with any cash register of network 1000, bar code message data sent by bar code reading terminal 10-1 intended for processing by cash register 100-1 might inadvertently be sent to cash register 100-2 and cash register 100-3 to corrupt transaction data being processed by each of cash registers 100-1, 100-2, and 100-3. In one embodiment, transaction data, including price and account data might have attached thereto a transaction number. If bar code message data is sent to the cash register other than an intended cash register, the bar code message data, price and item information derived using the bar code message data can be expected to have attached thereto an erroneous transaction number.

In FIG. 1b there is shown a system block diagram including a bar code reading terminal 10 and cash register 100 which may be wirelessly connected to one another. Bar code reading terminal 10 and cash register 100 each can include a radio transceiver. In one embodiment, bar code reading terminal 10 can include a Bluetooth radio transceiver 1160 and cash register 100 can also include a Bluetooth radio transceiver 2260. Both bar code reading terminal 10 and cash register 100 can incorporate the Bluetooth protocol stack which includes various layers that are depicted in FIG. 1c. A Bluetooth protocol stack includes a radio layer 702, a baseband layer 704, a link controller 706, a link manager (LM) 708, a host controller interface (HCI) 710, an L2CAP layer 712, RFCOMM/SDP layer 714, and applications layer 716. Such a Bluetooth stack can be incorporated in each of the bar code reading terminals 10 and each of the cash registers 100 of the retail store network 1000 of FIG. 1a.

Additional features and components which can be incorporated into bar code reading terminal 10 are now described. Bar code reading terminal 10 of FIG. 1b may include an image sensor assembly including an image sensor array 1164 and a lens 1165 for focusing an image of a substrate bearing a bar code onto image sensor array 1164. Such a substrate can be e.g., a soup can 205 bearing a bar code 206 as shown in FIG. 1a. In the specific embodiments shown, image sensor array 1164 is provided by a CMOS image sensor array. However, image sensor array 1164 could be of another type such as a CCD image sensor array or a CID array. Image sensor array 1164 can include a plurality of pixels formed in a plurality of rows and columns of pixels. In the specific embodiment shown, the image sensor array has a pixel array of 1280×1024 pixels. The image sensor array can be a color image sensor array having a Bayer pattern filter applied over the pixels of the image sensor array. In another embodiment the image sensor array could be a linear image sensor array having an array of e.g., 1280×1 pixels or 1280×2 pixels. Referring to further aspects of image sensor array 1164, image sensor array 1164 can be formed on image sensor integrated circuit 1162 which includes among other elements row circuitry 1166, column circuitry 1168 including readout circuitry, timing and control circuitry 1176, gain circuitry 1170, A/D converter 1172, and line driver 1174.

Image sensor integrated circuit 1162 in one embodiment operates under the control of microprocessor IC 1140 including operating CPU 1142. In response to receipt of a trigger signal as may be initiated by depressing trigger 1150, microprocessor IC 1140 can send a frame capture initiation command over $I^2C$ bus 1145 to image sensor integrated circuit 1162. Timing and control circuit 1176 can interpret such a command and can send various exposure, readout and reset signals and other timing and control signals to image sensor array 1164. Also in response to a trigger signal being initiated, illumination assembly 1160 can illuminate a substrate e.g., substrate 205 subject to bar code decoding. In response to receipt of the signals from pixels of image sensor array are read out, amplified by gain block 1170 digitized by A/D converts 1172, and sent to line driver 1174. Pixel values can be output from image sensor IC 1162 pixel by pixel and row by row until a frame of image data comprising rows and columns of pixels are output. Bar code reading terminal 10 can include FPGA 1180 performing a DMA function to transfer image data output from image sensor IC 1180 to memory 1250. When microprocessor IC 1140 has captured a frame of image data into RAM 1250, the microprocessor can further process the image data for decoding of bar codes. While in the embodiment shown, bar code reading terminal 10 includes a single microprocessor IC for receiving inputs and outputs and for decoding of bar codes. Bar code reading terminal 10 can include a separate decode processor IC that is interfaced to processor IC 1140. In addition or in place of having the bar code reading unit including the elements 1165, 1162, 1140, and 1250, terminal 10 can include an encoded information unit 1212 connected to system bus 1144 for access by microprocessor IC 1140. Encoded information reader unit 1212 can include one or more of a bar code reader unit 1214, an RFID reader unit 1216 and a card reader unit 1218, which are described in greater detail herein.

Referring to further aspects of bar code reading terminal 10, bar code reading terminal 10 can include a program memory such as EPROM 1152 and a storage memory 1154 such as a hard drive. Bar code reading terminal 10 can also include an I/O interface such an Ethernet or USB interface. Various component of bar code reading terminal 10 can be in communication via system bus 1144. Bar code reading terminal 10 can also include an optional user interface block 1119 including such elements as keyboard 1124, display 1120 having touch screen overlay 1121, and pointer controller 1122. In some embodiments however, bar code reading terminal 10 can be provided in a form without a display 1120. Provisioning a bar code reading terminal 10 to be devoid of a display 1120 allows the terminal to be made at a lower cost and with greater durability. Operators may better focus on reading bar codes using display-less terminals without being distracted by displays of a terminal. In other embodiments it is highly useful to incorporate a display on terminal 10.

All of the above components described relative to terminal 10 can be incorporated in and supported by a portable hand held housing 11 which can be operated at a location spaced apart from cash register 100. An enlarged front view of an exemplary hand held housing 11 which can support and encapsulate components of terminal 10 is shown in FIG. 1*d*.

A block diagram of a cash register 100 is also shown in FIG. 1*b*. Cash register 100 can include a microprocessor IC having a CPU 2242, a keyboard 2224, a display 2220, a touch screen overlay 2221, a pointer controller 122, a radio transceiver 2260 as described previously, an I/O interface 2262, a working memory or RAM 2250, a program memory 2252 such as may be provided by EPROM, and storage memory 2254, e.g., a hard drive. A cash register 100 can also include a cash drawer 125 as is indicated in the view of FIG. 1*a*. The components can be in communication via system bus 2244. The cash register 100 can incorporate a real time operating system such as WINDOWS XP supporting advance applications and GUI functionality and can incorporate the TCP/IP protocol stack. Cash register 100 can incorporate a common PC based platform. While methods and apparatus are described herein for uniquely associating an encoded information reading terminal to a cash register computer (cash register), it is understood that inherent in a method and apparatus for uniquely associating a device to a cash register is a method and apparatus for uniquely associating a device to a computer. It will be useful in certain instances to utilize methods and apparatuses described herein referencing a cash register for purposes of uniquely associating a device to a computer that is not a cash register. While a retail store implementation is emphasized in one embodiment, it will be understood that the unique association method and apparatus described herein can find use outside of a retail store environment, wherein a computer to which a mobile device is to be associated is provided by a device other than a cash register.

One such application is an assembly line application wherein assembly line workers carry hand held bar code reading terminals, and work at work stations of an assembly line. At each work station location there is typically located a single computer, such as a PC. It is important in such applications that each bar code reading terminal is associated with a single computer in order to aid the effort of maintaining track as to the originating work station of bar code message data. In such applications it might be desirable for computers at various assembly line work stations to package data packets including a bar code message and transaction number. If bar code message data is sent to a computer other than an intended computer, the bar code message data can be expected to have attached thereto an erroneous transaction number. Also in such applications, a computer at a certain work station might have an application for presenting and/or processing received bar code message in a specified manner. If bar code message data is sent to a computer other than the intended computer, the bar code message might be presented and/or processed in an unintended manner.

Another application where the described unique association method and apparatus would be useful is a hospital application wherein bar code reading terminals are to be associated with a computer in the form of a PC on a medicine cart. In such applications it might be desirable for cart computers to package data packets including bar code message and an attached cart identifier for further inventory and record keeping processing. If bar code message data is sent to a computer other than the intended computer, bar code message data can be expected to have attached thereto an erroneous cart number and such processing can be expected to become corrupted. Also, a cart computer might be configured so that an application of cart computer triggers the opening of a certain cart drawer on the receipt of certain bar code message. If bar code message is sent to a cart computer other than the intended cart computer, a medicine cart drawer might be triggered opened unintentionally.

Referring again to encoded information reader unit 1212, encoded information reader unit 1212 can include one or more of bar code reader unit 1214, RFID reader unit 1216, and card reader unit 1218. Bar code reader unit 1214 may be provided, e.g., by an IT4XXX/5XXX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, Maxi-Code, Data Matrix, QR Code, Aztec, Aztec Mesa, Code 49, UCC Composite, Snowflake, Data Gliffs, Code 39, Code 128, Codabar, UPC, EAN, Interleaved 205, RSS, Code 93, Codablock, BC412, Postnet, Planet Code, Japanese Post, KIX (Dutch Post), OCR A and OCR B. Encoded information reader unit 1212 can also include an RFID reader unit 1216 such as that may be provided by a Skytek Sky Module M1 reading terminal and card reader unit 1218 which may include an integrated circuit card (IC CARD) reading unit otherwise known as a smart card reader. Because encoded information reader unit 1212 of terminal 10 can decode encoded data other than bar code message data, it is understood in all instances described throughout herein where it is described that terminal 10 sends decoded bar code message data to cash register 100, terminal 10 could in addition or in the alternative send other decoded message data such as decoded RFID message data, decoded mag stripe message data or decoded smart card message data. Terminal 10 is referred to herein as a bar code reading terminal. However, it will be understood that in any of the embodiments described a bar code reader unit can be removed from terminal 10 and terminal 10 can be simply a terminal without being a bar code reading terminal. Where terminal 10 incorporates a bar code reader unit, it can be referred to as a bar code reading terminal or simply a terminal. Terminal 10 can be configured so that terminal 10 decodes an encoded dataform in response to a user initiated command. Such a user initiated command may be initiated in response, e.g., to trigger 1150 being actuated, or in the case of a card reader, a card being moved through a slot disposed on housing 11 (not shown). Where terminal 10 incorporates a card reader unit, it may be referred to as a card reading terminal or simply a terminal. Where terminal 10 incorporates an RFID reader unit it may be referred to an RFID reading terminal or simply a terminal.

Referring now to FIG. 1e, FIG. 1e shows an imaging module 1402 that can form part of a bar code reader unit of terminal 10. Imaging module 1402 can be provided by an IT4XXX imaging module of the type available form Hand Held Products, Inc. of Skaneateles Falls, N.Y. Imaging module 1402 can include first circuit board 6314A, second circuit board 6314B, support assembly 6380 and optical plate 6326 including aiming optics such as aiming optics 6325 and illumination optics 6327. Imaging module 1402 can include a lens 1404 provided by e.g., a lens singlet, lens doublet or lens triplet. Lens 1404 focuses an image of a bar code symbol 206 onto two-dimensional image sensor 1406 which can comprise a plurality of pixels formed in a plurality of rows and a plurality of columns. Imaging module 1402 can also include conductive support posts 6384 holding together the devices of the circuit board and delivery power between circuit boards of the imaging module. Imaging module 1402 when provided by an IT4XXX imaging module the type available from Hand Held Products, Inc. is available in a form with an associated decode out circuit for decoding bar code symbols and other decodable indicia such as MaxiCode PDF 417, Micro PDF 417, Data Matrix, QR Code, Aztec Code, RSS Code, Postal Codes, Code 39, Code 93, Interleaved 205, Code 128, UPC, EAN and UPC/EAN, OCR A and OCR B. Imaging module 1402 can include support assembly 6381 supporting components of imaging module 1402 such as lens 1404 and circuit board 6314a, and 6314b. Imaging module 1402 can include aiming LEDs 6318 mounted on circuit board 6314b. Light from aiming LEDs 6318 is shaped by slits 6343 of support assembly 6381 which slits are imaged onto a substrate e.g., soup can substrate 205 by lenses 6325 as shown in FIG. 1a to form an aiming pattern on bar code 206. Light from LEDs 6316 is shaped in part by optics 6327 to illuminate an area that substantially corresponds to a field of view of imaging module 1402. Support assembly 6381 can include an integrated retainer 6382 for retaining lens 1404. Bar code reader unit 1214 can be configured to attempt to read bar codes and to read bar codes in response to a trigger signal being initiated. Terminal 10 can be configured so that such a trigger signal is initiated, e.g., when trigger 1150 or another button of terminal 10 is depressed, or when a trigger signal command is received from an external computer, such as host computer 100. Bar code reader unit 1214 can also be a laser scanning type bar code reading unit, e.g., such as may be provided by an MS-3 Laser Scanner OEM Module available from MICROSCAN. As best seen in the view of FIG. 1d, imaging module 1402 can be supported by and encapsulated by hand held housing 11. Further, housing 11 can be configured so that trigger 1150 can be actuated when housing 11 is grasped by a user. Accordingly, there is provided in one embodiment a bar code reading terminal 10 having a hand held housing 11 devoid of a display encapsulating at least one component of a bar code reader unit, the housing being configured so that a user can actuate the manual trigger 1150 when grasping said housing, the bar code reading terminal being configured so that when said manual trigger is actuated said bar code reader unit produces a decoded bar code data message.

Referring to FIG. 1f, FIG. 1f shows a block diagram of a RFID reader/writer unit 1216 that can be incorporated in terminal 10. RFID reader/writer unit 1216 (referred to herein simply as an "RFID reader unit") can include transmitter 1602, antenna 1604, receiver 1606, data decode processing circuit 1608 and writer 1610. RFID reader/writer unit 1216 can be used to activate a passive tag. The passive tag can include a storage device, a transponder and an antenna. For activation of a passive tag transmitter 1602 can send an activation radio signal over antenna 1604 which is received by an antenna for activation of the transponder. In response to the receipt of the activation signal, the transponder is actuated to transmit a radio signal representing identification data encoded into passive tag. RF receiver circuit 1606 in turn receives the radio signal from the passive tag and converts the data into a processable digital format. Data decode processing circuit 1608 of RFID reader/writer unit 1216 typically includes a low cost micro controller IC chip and decodes the received radio signal information received to decode the identification data originally encoded into the RFID tag. The RFID tag can be applied to e.g., articles for sale in a retail store, or to an identification card such as a credit or debit card. The RFID tag can also be used independent of an identification application. For example, the RFID tag can be used as a token in security applications or as a tool for use in reconfiguring a data collection terminal. RFID reader unit 1216 can be operated in a continuous read mode or in an active read mode. In an active read mode, RFID reader unit 1216 attempts to read and reads data from a tag in response to a trigger signal being initiated. Terminal 10 can be configured so that a trigger signal is initiated by e.g., depressing trigger 1150 (FIG. 1*a*) or another button of bar code reading terminal 10.

Referring to FIG. 1*g*, FIG. 1*g* shows a block diagram of card reader unit 1218 that can be incorporated into terminal 10. Card reader unit 1218 can have reading and/or writing functionality and can be a card reader unit for reading financial transaction cards. Card reader unit 1218 can be an integrated circuit card reader unit also known as a smart card reader unit which can read data from and write data to a smart card. Card reader unit 1218 can include electrical contacts 1802, signal detection circuit 1804, card decoder 1806 and encoder 1808. Contacts 1802 of card reader unit 1218 are adapted for making contact with an integrated circuit of an integrated circuit card (smart card) which may be, e.g., a credit card, a debit card, an electronic benefits card, a customer loyalty card or simply an integrated circuit card used as a token for security applications or as a tool for use in reconfiguring terminal 10. When contacts 1802 are in contact with integrated circuit 1822 of card 1820, signal detection circuit 1804 picks up an electrical signal and information stored on integrated circuit 1822 is then decoded by card decoder 1806. Card reader unit 1218 further includes an encoder 1808 for encoding data which is to be written onto card 1820. When card 1820 is in contact with card reader unit 1218, card reader unit 1218 can be activated so that encoded data for encoding a card is written onto integrated circuit chip integrated circuit 1822 of card 1820.

Figure 2A:
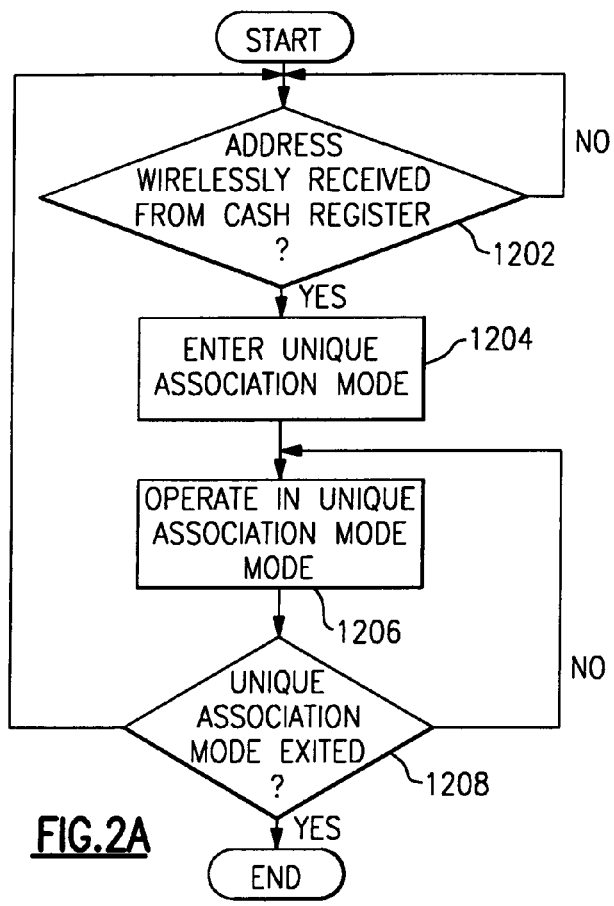
FIG. 2a is a flow diagram illustrating steps of a process that can be carried out by a bar code reading terminal operating within a retail store network.

In accordance with network 1000 a bar code reading terminal 10 can be configured to automatically enter a unique association mode terminal 10 subsequently to wirelessly receiving a cash register address from a cash register of the plurality of cash registers 100-1, 100-2, 100-3 of system 2000. The flow diagram of FIG. 2*a* will be described in connection with a hypothetical example in which bar code reading terminal 10-1 is first being introduced into network 1000 retains no previously obtained address information or any other information respecting any node of the retail store network 1000, and it is desired that terminal 10-1 will operate at the checkout station managed by cash register 100-1 for aiding in the assembly of transaction requests being packaged by cash register 100-1. Further aspects of the flow diagram of FIG. 2*a* are described in connection with a specific example of an implementation in which bar code reading terminals 10-1, 10-2 and 10-3 incorporate Bluetooth radio transceivers and Bluetooth protocol stacks.

Briefly at block 1202, bar code reading terminal 10-1 waits for bar code reading terminal 10-1 to wirelessly receive a device radio address from cash register 100-1, which can be referred to as a cash register address, and, if terminal 10-1 wirelessly receives a cash register address terminal 10-1 proceeds to block 1204 to enter a unique association mode in which the bar code reading terminal is uniquely associated with the cash register wirelessly sending a cash register address. Terminal 10-1 then operates in a unique association mode (block 1206) until at block 1208 terminal 10-1 receives a command to exit the unique association mode. In one embodiment, bar code reading terminal 10 can be configured to return to a wait state (block 1202) on receiving a command to exit the unique association operating mode. In one embodiment, bar code reading terminal 10-1 at block 1202, in waiting for a cash register address waits for a cash register to initiate a connection with the bar code reading terminal 10-1 by sending a connecting request to bar code reading terminal 10-1. All of the steps of the flow diagram of FIG. 2*a* except where otherwise noted can be carried out automatically, i.e., without requiring initiation by a user input command.

By configuring terminal 10-1 to wait for a cash register address to be wirelessly received for entering a unique association mode, retail store network 1000 is established so that bar code reading terminals 10-1, 10-2, 10-3 even where devoid of displays, can be easily and quickly set up for unique association with a specific cash register with there being little risk of a mistake in the association process being made. With reference to the specific example of Bluetooth enabled devices, among numerous other functions, Bluetooth devices can, in general, (i) generate inquiry requests in which they request data identifying Bluetooth devices in range of the inquiring device (ii) receive and respond to inquiry requests (iii) generate connection requests, and (iv) respond to connection requests. When generating an inquiry request, a Bluetooth device is regarded as being in a discovery mode. For receiving an inquiry a Bluetooth device can be set to a discoverable mode. The generating of connection requests is referred to as "paging" in literature relating to the Bluetooth Standard, and the responding to a connection request is referred to as "page scanning." The Bluetooth Specification, Volumes 1.0, 1.0B, 1.1, 1.2, and 2.0+EDR is incorporated herein by reference. Features described herein with reference to system 2000 can also be practiced with alternative wireless communication technologies such as IEEE802.11, Wireless USB, ZigBee, and Z-Wave.

Regarding inquiry requests, an inquiry request can be made by a Bluetooth device in order to determine the devices in range of the Bluetooth device. In typical use of a Bluetooth enabled device, the inquiry mode is often executed as part of a process of connecting a Bluetooth device to a specific external device to which connection is desired. As part of an inquiry request, designators for various devices can be displayed on a display of the Bluetooth device. A user can then select a displayed designator designating the desired device to connect to and a paging request is initiated to make the desired connection to the device designated by the selected designator. While such processes, it will be seen, can be useful where terminals are equipped with displays, terminals 10-1, 10-2, 10-3 cannot display designators for in range devices when they are devoid of displays as in terminals 10-1, 10-2, 10-3 shown in the view of FIG. 1*a*. Configuring terminal 10-1 to enter a unique association mode when wirelessly receiving a cash register address from a cash register 100-1 according to an embodiment described herein overcomes convenience restrictions imposed by radio equipped devices being devoid of displays.

Figure 3A:
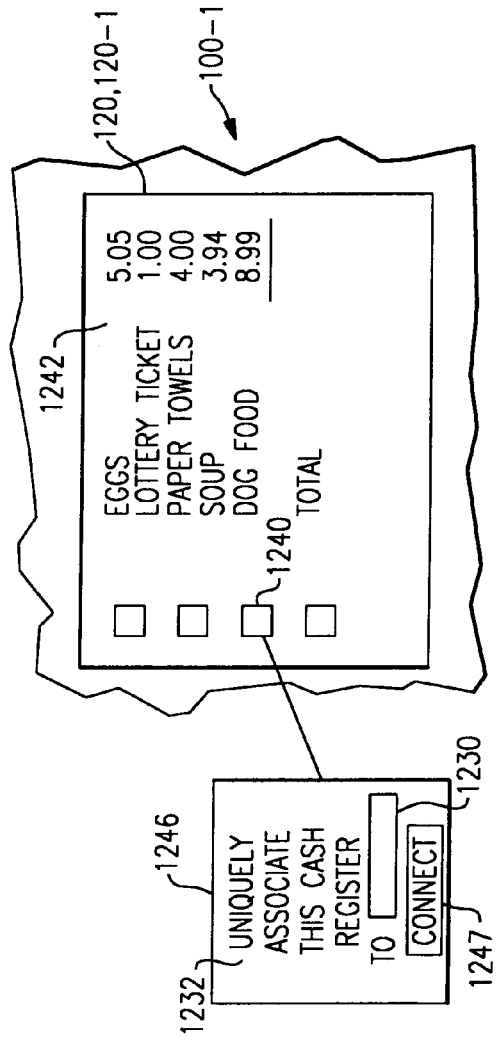
FIG. 3a illustrates a screen display that can be displayed on a cash register display incorporating a graphical user interface display screen enabling a user to input data into a data entry field of the user interface display screen a designator designating a bar code reading terminal to which a connection request may be sent for initiating of a unique association mode of operation.

For bar code reading terminal 10-1 to wirelessly receive a cash register address from one cash register out of a plurality of cash registers, the one cash register can be operated to send a connection request to terminal 10-1. For such operation, cash register 100-1 can be equipped with a simple application, specially designed for use in network 1000 enabling it to be operated to send a connection request to terminal 10-1. As shown in FIG. 3*a* cash register 100-1 can be configured to display on display 120-1 of cash register 100-1 the graphical user interface screen as shown in FIG. 3*a* having data entry field 1230 for receiving the device address of bar code reading terminal 10-1 and prompting text 1232 prompting a user to enter the device address for bar code reading terminal 10-1. Terminal 10-1 as shown in FIG. 1*a* can have a label 1236 attached thereto indicating the radio address of the terminal 10-1. The user can simply read the address information and type in the radio address into field using keyboard 124-1. As indicated by the view of FIG. 3a cash register 100-1 can display an application designator 1240 which is displayed at the time that transaction information 1242 is being displayed on display 120-1. When a user clicks on application icon 1240, the screen display of display 120-1 is updated to include window 1246 having a data entry field 1230. Cash register 100-1 can be configured so that when connect button 1247 is actuated, e.g., by touching touch pad 121 overlaid on display 120 or with use of a pointer controller 122 cash register 100-1 sends a connection request to the specific bar code reading terminal having the address typed into data entry field 1230.

Figure 3B:
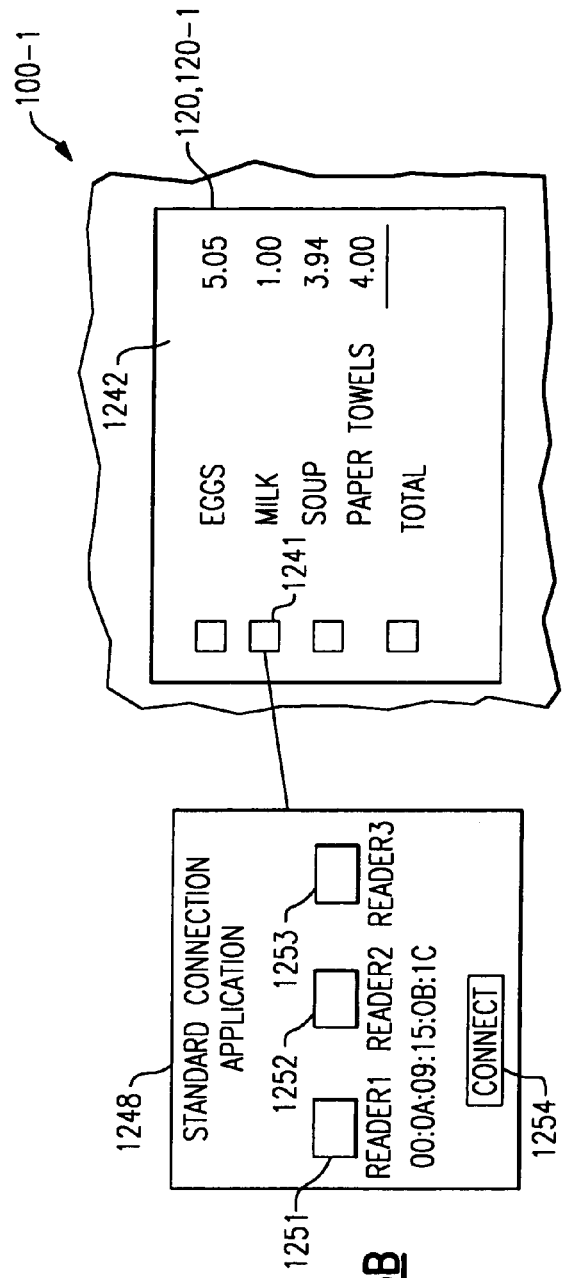
FIG. 3b is an alternative screen display that may be displayed on a display of a cash register. In the screen display of FIG. 3b there is shown designators for terminals that may be in range of a cash register within a retail store network. Such a screen display may be displayed after a cash register is operated in a discovery mode during which time the cash register performs an inquiry. When a discovery mode is active, there can be displayed on the display of a cash register, designators for terminals in range of the cash register. One of the designators for a terminal desired to be uniquely associated with the cash register can be selected. A connection to the selected bar code reader reading terminal can be initiated for initiation of a unique association mode of operation.

While the embodiment described in FIG. 3a indicates an application specifically developed for use in system 2000, cash register 100-1 can be operated to send a connection request to a specific bar code reading terminal which is desired to be in unique association with the cash register without running any specially developed application specifically developed for use in retail store network 1000. Specifically, cash register 100-1 can be operated to send a connection request to a specific bar code reading terminal 10-1 using a generic connection interface of the type that is typically provided by a provider of a radio. Such a generic connection interface is shown in FIG. 3b. Cash register 100-1 can be configured so that screen display of FIG. 3b is displayed when an icon 1241 designating the connection application is clicked on. When icon 1241 is clicked on, cash register 100-1 enters an inquiry or a discovery mode and displays on display 120-1 window 1248 as shown in FIG. 3b. Window 1248 displays designators 1251, 1252, 1253 for all devices in range of cash register 100-1. The designators can be the radio addresses of the devices and/or "friendly" names, e.g., reading terminal1, reading terminal2, etc. In selecting the desired bar code reading terminal a user may refer to a radio label 1236 of the terminal to confirm that the desired terminal has been selected. Cash register 100-1 can be configured in accordance with the connection application to execute a connection request (page) when a desired designator is selected and clicked on or when highlighted and connect button 1254 is clicked on.

In the example of a Bluetooth enabled cash register, cash register 100-1 can send out a series of paging packets when operated to make a connection request. For execution of block 1202 (wait for cash register address to be wirelessly received) bar code reading terminal 10-1 can be commanded to enter into a page scanning mode in which the terminal waits to be paged. When terminal 10-1 receives a paging packet (the paging packet sent by the cash register) having the bar code reading terminal device radio address the bar code reading terminal can reply to the cash register 100-1 sending cash register 100-1 an acknowledge packet. In response to the acknowledge packet received from the terminal the cash register can send a frequency hop synchronization (FHS) packet to the bar code reading terminal to send the bar code reading terminal 10-1 the cash register frequency hop sequence and radio address (BD_ADDR) of the cash register, i.e., the address of the cash register. On receipt of the FHS packet, the bar code reading terminal can send another acknowledge packet to the cash register and can extract necessary parameters from the FHS packet. Terminal 10-1 can save the cash register address. The cash register address can be saved for initiation of unique association mode. In addition to a frequency hop sequence there can be included in an FHS packet a device class identifier. The device class identifier can indicate whether the paging device is e.g., a personal computer or a mobile phone. In that cash registers are commonly based on PC platform, bar code reading terminal 10-1 can be configured, as part of block 1202 to confirm that cash register 100-1 has made a page by verifying that a received FHS packet received at block 1202 includes a class identifier indicating a PC. Terminal 10-1 can be configured so that if it determines that a class identifier of a received FHS packet does not indicate a PC class, it avoids entering a unique association made even though it receives a device address when receiving an FHS packet. When receiving the FHS packet from cash register 100-1 bar code reading terminal 10-1 can use the frequency hop information to synchronize with the hop sequence of the cash register and a connection is made.

Steps of an exemplary connection request are described with reference to FIG. 2b. Four packet transmissions have been described hereinabove. At step 1252 cash register 100-1 sends a paging packet to terminal 10-1. At step 1254 an acknowledgement packet is returned. On receipt of the acknowledgement packet cash register 100-1 at step 1256 can, at step 1258 send an FHS packet and on receipt of the FHS packet terminal 10-1 can send another acknowledgement packet. Additional messages may be communicated between cash register 100-1 and terminal 10-1 as are indicated in the diagram of FIG. 2b. Specifically for completion of a connection, cash register 100-1 and terminal 10-1 can send a series of Link Manager Protocol (LMP) messages. At step 1260 cash register 100-1 can send an LMP_hostconnection_req message, and at step 1262 terminal 10-1 can respond with an LMP_accepted message. At step 1264 cash register 100-1 can send an LMP_setup_complete message and at step 1266 terminal 10-1 can respond with an LMP_setup_complete message. On receipt of the LMP_setup_complete message the connection between the cash register and the terminal can be regarded as complete.

It has been indicated that bar code reading terminal 10-1 can be configured to wait for a cash register address to be wirelessly received from a cash register and to automatically enter into a unique association mode subsequently to receiving a cash register address from one cash register out of a plurality of cash registers. Further, in one embodiment, a bar code reading terminal can be configured to wait for a cash register address to be transmitted as part of a connection request initiated from a cash register. Illustrative characteristics of bar code reading terminal 10-1 which can be exhibited by bar code reading terminal when operating in a unique association mode are described herein. The steps of a connection process described with reference to FIG. 2b can occur automatically and with little time delay between the steps. Bar code reading terminal 10-1 can be configured to enter into a unique association mode subsequent to any number of possible steps described in connection with FIG. 2b, e.g., during a connection request prior to completion of a connection, or when a connection has been completed. In one embodiment, terminal 10-1 is configured so that entering of a unique association mode is conditioned on the condition that terminal 10-1 receives an address from a cash register in an FHS packet sent from the cash register (step 1258, FIG. 2b) without being conditioned on terminal 10-1 completing any further packet transmission called for as part of the exemplary connection protocol described in connection with FIG. 2b and without a connection being complete. In another embodiment bar code reading terminal 10-1 is configured so that entry of a unique association mode is conditional on the terminal receiving the message described relative to step 1264, FIG. 2b. In other words, while the sending of a connection request is a convenient mechanism for transmitting a cash register address to a bar code reading terminal, there is in one embodiment no requirement that such a connection actually be completed for a bar code terminal to be driven into a unique association mode of operation.

In one aspect of a unique association mode in one embodiment, bar code reading terminal 10-1 only sends decoded bar code message data to the cash register sending the address waited for at block 1202 for the time that the terminal operates in a unique association mode. Bar code reading terminal 10-1 can be configured to attempt to decode and transmit decoded out bar code message data every time a trigger signal is initiated e.g., by depression of trigger 1150. The terminal further can be configured so that on the receipt of a trigger signal the bar code reading terminal transmits any decoded bar code message data decoded as a result of the receipt of the trigger signal over an existing connection if a connection is present and attempts to initiate a connection if there is no present connection. Bar code reading terminal 10-1 can be configured so that as part of operating in accordance with a unique association mode, the bar code reading terminal utilizes and manages the address of the cash register initiating the connection determined to have been initiated at block 1202 in a specific manner. Bar code reading terminal 10-1 can save a cash register address in a memory thereof, and can use the saved address to reconnect to a cash register sending it if a connection is lost. The bar code reading terminal can also store the cash register address in a nonvolatile memory e.g., memory 1152 and can use the address for reconnecting to the cash register if a connection is lost as a result of a power loss of terminal 10-1.

It has been mentioned that a cash register address can be wirelessly sent from a cash register to a bar code reading terminal as part of a process of initiating a connection with the bar code reading terminal. Such a connection can be completed or not completed. In one embodiment a bar code reading terminal can be configured to send bar code messages to a cash register over a connection that is initiated by a cash register between a cash register and terminal.

In another embodiment, a bar code reading terminal can be configured to initiate a connection to a cash register sending the cash register address listed for at block 1202 when entering a unique association mode. In such an embodiment, a bar code reading terminal can automatically close a connection initiated by a cash register for sending of a cash register address after entering a unique association mode and then initiate a new connection to the cash register. Bar code reading terminal 10-1 can be configured so that bar code reading terminal 10-1 on being driven into a unique association mode automatically closes the cash register connection driving it into a unique association mode (if completed) and subsequently remakes a new connection with the cash register utilizing the received address of the cash register (by paging using the cash register address). Such a process of closing and subsequently automatically remaking the connection or otherwise initiating a connection from a bar code reading terminal to a cash register provides certain advantages.

One advantage of configuring a bar code reading terminal 10-1 to initiate a connection with a cash register and possibly close any existing connection between a cash register and a bar code reading terminal when entering a unique association mode is that such a configuration enables communication ports (comports) of a cash register to be associated with specific bar code reading terminals being uniquely associated with a cash register without requiring special programming of a cash register. It is advantageous for purposes of simplifying software development to design system 2000 so that each time a certain bar code reading terminal communicates bar code message data to a cash register after being uniquely associated the communication is through the same comport of a cash register. Configuring system 2000 so that terminals communicate through the same comport each time they send bar code messages allows data management software to be developed in an application layer wherein terminals are identified by comport numbers without requiring the development of lower layer code for identifying terminals by way of mapping device addresses. PCs are often set up so that a first set of comports are reserved for connections to an external device initiated by the PC and a second set of comports are reserved for connections to a PC initiated from an external device. Accordingly, configuring system 2000 so that a terminal uses a common comport when in a unique associated mode can be accomplished by always initiating communications between a terminal and a cash register in a common direction (i.e., always cash register to terminal or always terminal to cash register).

In one embodiment, system 2000 can be configured so that all connections between a cash register 100-1 and a terminal 10-1 are initiated by cash register 100-1 including an initial connection. However, in such an embodiment, special programming of the cash register might be required for the terminal to exhibit certain characteristic described herein that can be exhibited by terminal 10-1 when operating in a unique association mode. For example, a cash register 100-1 might be programmed with special programming to monitor whether a terminal has moved out of range of a cash register, and further special programming of the cash register might be incorporated so that a connection between a terminal and cash register is re-made when a terminal is moved back in range of a cash register. In one aspect of system 2000 it is advantageous to avoid special programming of cash register 100-1 so that system 2000 including network 1000 can be easily and quickly set up.

Accordingly in one embodiment, system 2000 can be configured so that all connections between a cash register and terminal 10-1 for purposes of sending decoded bar code message data are imitated by a terminal, e.g., 10-1 to the cash register, e.g., 100-1. Configuring system 2000 so that all connections between a terminal and cash register for purposes of sending decoded message data simplifies set up of network 1000, as the system can be set up without incorporating any special programming of any cash register of the system. Appropriately programmed terminals programmed for operation in system 2000 can simply be introduced into the system and they will work with legacy cash registers having baseline radio functionality. Programming of the terminals 10 rather than the cash registers 100 is much simpler and can be accomplished off line, perhaps at a manufacturing facility away from the retail store before shipping to a retail store, without requiring a down time of a cash register of system 2000. In one embodiment, a unique association mode of operation is characterized by the bar code reading terminal for the time that said bar code reading terminal remains in said unique association mode utilizes only the certain cash register address received at block 1202 when initiating a network connection for the transmission of decoded out bar code message data to an external device Bar code reading terminal 10-1 can be configured so that a connection between cash register 100-1 and terminal 10-1 may be closed in other instances; besides the instance of an automatic closure on the making of an initial connection during the time that bar code reading terminal 10-1 operates in a unique association mode. A connection may be closed (lost), for example, when bar code reading terminal 10-1 moves out of range of cash register 100-1. Bar code reading terminal 10-1 can also be configured to calculate a timeout period when connected to a unique associated cash register when operating in a unique association mode and close a connection with a cash register if no decoded bar code data is transmitted to the uniquely associated cash register within the timeout period. The bar code reading terminal can also be configured to that the timeout period is user selectable, e.g., by reading programming bar code symbols.

Regarding the instance where bar code reading terminal is moved out of range of cash register 100-1, terminal 10-1 in accordance with the unique association mode of operation can be configured to (i) buffer any decoded bar code messages when out of range of the cash register, and (ii) attempt to reconnect to the uniquely associated cash register when moving back into range of the cash register. When making such a reconnection attempt, the bar code reading terminal can page the uniquely associated cash register utilizing the saved cash register address. If a connection attempt is successful with the bar code reading terminal back in range, the bar code reading terminal can transmit the buffered decoded bar code message data to the uniquely associated cash register. In one embodiment, bar code reading terminal 10-1 can be programmed to monitor for beacon packets from a cash register and calculate a link supervision timeout. If the timeout expires prior to receipt of a beacon packet, the bar code reading terminal 10-1 can determine that it has moved out of range of a cash register and may begin buffering any decoded bar code messages.

Regarding the instance where a connection is closed pursuant to an inactivity timeout, bar code reading terminal 10-1 can be configured to attempt to reconnect a connection closed pursuant to an inactivity timeout on receipt of a trigger signal initiated for reading a bar code. Specifically, bar code reading terminal 10-1 can be configured to initiate a closed connection closed pursuant to an inactivity timeout by paging using the saved cash register address.

It has been indicated that terminal 10-1 may make or remake a connection in numerous possible instances for purposes of transmitting decoded out bar code message data when operating in a unique association mode, e.g., after closing an initial connection initiated by a cash register, after moving out of range and then back into range, or after an inactivity timeout. In each one of the above noted instances, it is described that terminal 10-1 can utilize the address of cash register 100-1 initiating connection initiation waited for at block 1202 in order to make such connection. The unique association mode of operation in one embodiment can be characterized by the bar code reading terminal for the time that said bar code reading terminal remains in said unique association mode utilizing only the certain cash register address initiating the waited for connection initiation when initiating a network connection for the transmission of decoded out bar code message data to an external device.

In one embodiment a unique association mode of terminal 10-1 can be characterized by the bar code reading terminal being incapable of responding to one or more of inquiry requests or connection requests from any external device for the time that said bar code reading terminal remains in said unique association mode. For such operation, the terminal can be configured so that when entering the unique association mode the terminal executes a command to become undiscoverable and/or unconnectable. Executing such commands enhances the security of system 2000.

In accordance with a unique association mode bar code reading terminal 10-1 can be configured to initiate a role switch when initiating a connection with a uniquely associated cash register after any one of closing the initial connection initiated by the cash register, returning into range of the cash register or remaking a closed connection closed after an inactivity timeout.

According to the Bluetooth standard, a device initiating a connection is known as a Master and a device receiving a connection request is known as a Slave. The Master in a Master/Slave Bluetooth piconet establishes a hop sequence and also establishes time slots in which the slave devices are permitted to transmit data. In a retail store network it may be useful to associate more than one bar code reading terminal and possibly other devices to a single cash register. For bandwidth optimization it would be desirable to have the cash register 100-1 which may have associated therewith several devices designated as the Master in a Master/Slave relationship.

In order to accomplish bandwidth optimization, bar code reading terminal 10-1 can be configured to initiate role switch after connecting to cash register by paging utilizing the cash register address. When a role switch is executed, the terminal relinquishes its role as master which it had when making the connection and becomes a slave. The cash register relinquishes its role as a slave and becomes a master to establish time slots and frequency hops for devices which may be associated with the cash register.

Bar code reading terminal 10-1 can be configured so that bar code reading terminal 10-1 in response to receipt of a user-initiated command, can exit a currently active unique association mode. It may be desired to exit a unique association mode of operation in a variety of circumstances which can be envisioned. For example, it may be desired to switch the association of terminal 10-1 currently uniquely associated with cash register 100-1 so that the bar code reading terminal 10-1 is uniquely associated with another cash register such as cash register 100-3. Also, it may be desired to remove terminal 10-1 from network 1000 altogether and move into another retail store network.

Figure 2C:
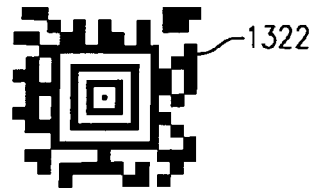
FIG. 2c illustrates a programming bar code symbol that can be configured in a complementary manner with a bar code reading terminal so that when read, the terminal can exit the unique association operating mode.
Figure 2B:
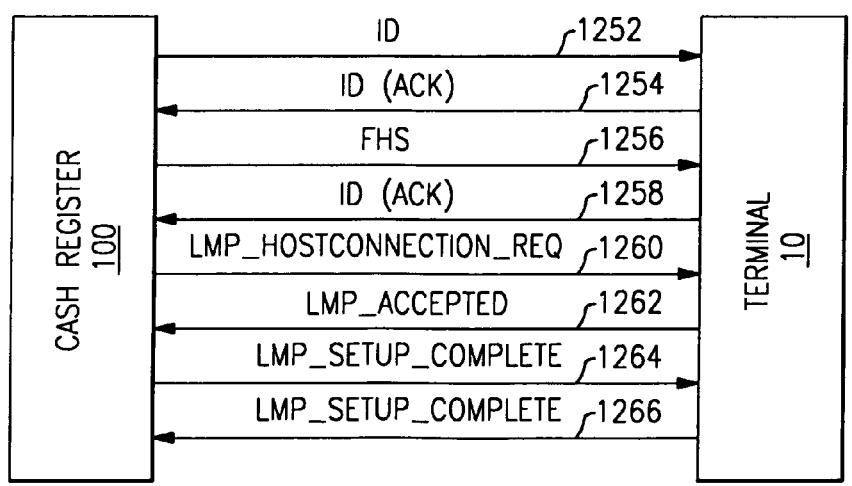
FIG. 2b is a diagram illustrating a series of steps that may be carried out between a cash register and a terminal for establishing a connection between a cash register and a terminal by way of a connection request being initiated by a cash register.

With reference to FIG. 2c a specially encoded programming bar code symbol 1302 can be provided for enabling a user to initiate a command to exit a unique association mode. Bar code reading terminal 10-1 can be complementarily configured with symbol 1302 so that when reading symbol 1322 bar code reading terminal 10-1 exits a currently active unique association mode. A user can cause terminal 10-1 to read symbol 1322 by moving terminal 10-1 so that symbol 1302 is in the field of view of terminal 10-1 and then actuating trigger 1150. In one embodiment terminal 10-1 can be configured so that when reading symbol 1322 terminal 10-1 exits a unique association mode and enters a mode of operation in which the terminal is capable of responding to inquiries and connection requests from devices in range of the terminal 10-1 including the cash register to which the terminal was just uniquely associated prior to the reading of the symbol and other devices external to the reading terminal, e.g., cash registers 100-2, and 100-3. As has been indicated, terminal 10-1 can be configured so that when operating in a unique association mode the terminal 10-1 is incapable of responding either to inquiries or connection requests from any external device. Because system 2000 can be configured so that terminal 10-1 returns to a wait state waiting for what can be a connection initiated by a cash register on reading of symbol 1322, a feedback line is provided in the flow diagram of FIG. 2a connecting exit block 1208 and wait block 1202. A decodable dataform other than a bar code symbol for programming terminal 10-1 in the manner of bar code symbol 1322 can be provided in addition to or in place of symbol 1322. For example, a smart card or an RFID tag for reading by terminal 10 (where a terminal incorporates an encoded information reader unit other than a bar code reader unit) can be provided which is encoded so that when read, terminal 10 operates in the same manner as in the case that terminal 10 reads symbol 1322).

A small sampling of the apparatus and methods that have been described herein above are as follows:

A1. A bar code reading terminal for use in a retail store network having a plurality of cash registers external to said bar code reading terminal, the bar code reading terminal comprising: a bar code reader unit; a manual trigger; a hand held housing devoid of a display encapsulating at least one component of said bar code reader unit, the housing being configured so that a user can actuate said manual trigger when grasping said housing, the bar code reading terminal being configured so that when said manual trigger is actuated said bar code reader unit produces a decoded bar code data message; a radio transceiver encapsulated by said housing; wherein said bar code reading terminal is configured to wait for a cash register address to be wirelessly received from one cash register of said plurality of cash registers and to automatically enter a unique association mode of operation subsequent to receiving said cash register address, wherein said one cash register has a certain cash register address and wherein said unique association mode of operation is characterized by the bar code reading terminal for the time that said bar code reading terminal remains in said unique association mode utilizing only said certain cash register address when initiating a network connection for the transmission of decoded out bar code message data to an external device. There is also described (A2) The bar code reading terminal of A1, wherein said bar code reading terminal is configured to wirelessly receive a cash register address from said one cash register as part of a connection request initiated by said one cash register. There is also described (A3) The bar code reading terminal of A1, wherein said bar code reading terminal is configured so that said bar code reading terminal wirelessly receives said cash register address when receiving a transmitted FHS packet transmitted by said one cash register. There is also described (A4) The bar code reading terminal of A1, wherein said bar code reading terminal is configured so that said bar code reading terminal enters said unique association mode when a connection request initiated by said one cash register results in a completed connection between said one cash register and said bar code reading terminal. There is also described (A5) The bar code reading terminal of A1, wherein said unique association mode is characterized by said bar code reading terminal automatically attempting to initiate a connection to said cash register utilizing said cash register address when entering said unique association mode. There is also described (A6) The bar code reading terminal of A1, wherein said bar code reading terminal is configured so that prior to entering said unique association mode said bar code reading terminal is prevented from wirelessly sending decoded bar code message data from said bar code reading terminal. There is also described (A7) The bar code reading terminal of A1, wherein said bar code reading terminal is configured so that said bar code reading terminal exits said unique association mode of operation when reading a specially encoded programming bar code symbol. There is also described (A8) The bar code reading terminal of A1, wherein said bar code reading terminal is configured so that said bar code reading terminal exits said unique association mode of operation when reading of a specially encoded programming bar code symbol, wherein said bar code reading terminal and said specially encoded programming bar code symbol are complementarily configured so that when said bar code reading terminal reads said specially encoded programming symbol, said bar code reading terminal enters a mode of operation in which said bar code reading terminal can respond to inquiry requests from external devices. There is also described (A9) The bar code reading terminal of A1, wherein said unique association mode of operation is further characterized by the bar code reading terminal being incapable of responding to inquiry requests from external devices for the time that said bar code reading terminal remains in said unique association mode. There is also described (A10) The bar code reading terminal of A1, wherein said unique association mode of operation is further characterized by said bar code reading terminal being incapable of responding to connection requests from external devices for the time that said bar code reading terminal remains in said unique association mode. There is also described (A11) The bar code reading terminal of A1, wherein said bar code reading terminal is configured to operate as one of a master or slave in piconet in which a master manages the allocation of communication time slots of said piconet, and wherein said unique association mode is further characterized by the bar code reading terminal automatically executing a role switch from master to slave while maintaining a connection to said cash register after connecting to said cash register. There is also described (A12) The bar code reading terminal of A1, wherein said unique association mode is further characterized by said bar code reading terminal buffering decoded bar code data collected by said bar code reading terminal when out of range of said one cash register, and transmitting said buffered decoded bar code data to said on cash register utilizing said certain cash register address when returning to a location in range of said at least one cash register. There is also described (A13) The bar code reading terminal, of A1, wherein said unique association mode is further characterized by said bar code reading terminal storing said certain cash register address in a non-volatile memory of a bar code reading terminal so that when a bar code reading terminal loses power and regains power, and receives a trigger signal after regaining power attempts to connect to said one cash register utilizing said certain cash register address to transmit decoded out bar code message data collected as a result of said receipt of said trigger signal to said one cash register. There is also described (A14) The bar code reading device of A1, wherein said unique association mode is further characterized by said bar code reading terminal monitoring data transmissions and disconnecting from said one cash register if said bar code reading device is not actuated to send bar code message data to said one cash register within a timeout period, the unique association mode further being characterized by said bar code reading terminal attempting to reconnect to said one cash register utilizing said cash register address if actuated to read a bar code when in a disconnected state.

B1. A method for operating a retail store network that includes at least first and second radio-equipped cash registers and a plurality of bar code reading terminals, said method comprising the steps of: (a) displaying on a display of said first cash register a designator for said bar code reading terminal and additional designators designating additional bar code reading terminals in range of said first cash register; (b) selecting said designator for said bar code reading terminal at said first cash register; (c) wirelessly sending an address of said first cash register to a bar code reading terminal identified by said selected designator selected at step (b); (d) saving said address at said bar code reading terminal corresponding to the selected designator; and (e) automatically initiating communication between said reading terminal and said cash register, said initiating step including the step of sending said address saved at step (d) to said cash register. There is also described (B2) The method of claim B1, wherein said designator for said bar code reading terminal is a Bluetooth address of said bar code reading terminal. There is also described (B3) The method of claim B1, wherein said initiating step (e) includes the step of performing said initiating after said bar code reading terminal has been moved into a location in range of said cash register after having been at a location in range of said cash register.

C1. A bar code reading terminal operating in a retail store network including a cash register, said bar code reading terminal comprising: an imaging assembly including at least one of (a) an image sensor in combination with optics focusing an image onto the image sensor or (b) a laser scan engine; a manual trigger for initiating bar code reading; a radio transceiver; wherein said bar code reading terminal is configured to wait for said cash register to wirelessly send a cash register address, the bar code reading terminal being configured to automatically enter a unique association mode when subsequent to receiving said cash register address, the bar code reading terminal on entering said unique association mode automatically attempts to initiated a connection to said cash register utilizing said cash register address.

D1. A system comprising: a bar code reading terminal having bar code reader unit, a manual trigger, a hand held housing devoid of a display encapsulating at least one component of said bar code reader unit, the housing being configured so that a user can actuate said manual trigger when grasping said housing, the bar code reading terminal being configured so that when said manual trigger is actuated said bar code reader unit produces a decoded bar code data message and a radio transceiver encapsulated by said housing, wherein said bar code reading terminal is configured to wait for a cash register address to be wirelessly received from one cash register of a plurality of cash registers and to automatically enter a unique association mode of operation subsequent to receiving said cash register address; and a programming bar code complementarily configured with said bar code reading terminal, the bar code reading terminal and the programming bar code being complementarily configured so that that said bar code reading terminal on reading said programming bar code exits said unique association mode if said unique association mode is active when said bar code reading terminal reads said programming bar code.

E1. A system comprising: a plurality of cash registers, each having a display; a bar code reading terminal having bar code reader unit, a manual trigger, a hand held housing devoid of a display encapsulating at least one component of said bar code reader unit, the housing being configured so that a user can actuate said manual trigger when grasping said housing, the bar code reading terminal being configured so that when said manual trigger is actuated said bar code reader unit produces a decoded bar code data message, the bar code reading terminal further including a radio transceiver encapsulated by said housing, wherein said bar code reading terminal is configured to wait for a cash register address to be wirelessly received from one cash register of a plurality of cash registers and to automatically enter a unique association mode of operation subsequent to receiving said cash register address; wherein said system is configured so that said cash register address waited for by said bar code reading terminal can be sent from said one cash register by commanding said one cash register to (i) display on said display designators for radio equipped devices in range of it so that one of the designators can be selected, the plurality of designators including a designator for said bar code reading terminal; and (ii) send a cash register address of said one cash register to said bar code reading terminal.

F1. A hand held encoded information reading terminal for use in a network having a plurality of computers external to said encoded information reading terminal, the encoded information reading terminal comprising: an encoded information reading unit selected from the group consisting of a bar code reader unit, an RFID reader unit, and a card reader unit; a manual trigger; a hand held housing devoid of a display encapsulating at least one component of said encoded information reader unit, the hand held encoded information reading terminal being configured so that said encoded information reader unit can produce decoded data messages; a radio transceiver encapsulated by said hand held housing; wherein said encoded reading terminal is configured to wait for a radio address to be wirelessly received by said radio transceiver from one computer of said plurality of computers and to automatically enter a unique association mode of operation subsequent to receiving said radio address, wherein said one computer has a certain radio address and wherein said unique association mode of operation is characterized by the encoded information reading terminal, for the time that said encoded information reading terminal remains in said unique association mode, being incapable of initiating a communication using said radio transceiver with an external device other than said one computer. There is also described (F2) The encoded information reading terminal of F1, wherein said encoded information reading terminal is configured to wirelessly receive a radio address from said one computer as part of a connection request initiated by said one computer. There is also described (F3) The encoded information reading terminal of F1, wherein said encoded information reading terminal is configured so that said encoded information reading terminal wirelessly receives said radio address when receiving a transmitted FHS packet transmitted by said one computer. There is also described (F4) The encoded information reading terminal of F1, wherein said encoded information reading terminal is configured so that said encoded information reading terminal enters said unique association mode when a connection request initiated by said one cash computer results in a completed connection between said one computer and said encoded information reading terminal. There is also described (F5) The encoded information reading terminal of F1, wherein said unique association mode is characterized by said encoded information reading terminal automatically attempting to initiate a connection to said one computer utilizing said radio address when entering said unique association mode. There is also described (F6) The encoded information reading terminal of F1, wherein said encoded information reading terminal is configured so that prior to entering said unique association mode said encoded information reading terminal is prevented from wirelessly sending decoded message data from said encoded information reading terminal. There is also described (F7) The encoded information reading terminal of F1, wherein said encoded information reading terminal is configured so that said encoded information reading terminal exits said unique association mode of operation when reading a specially encoded programming dataform. There is also described (F8) The encoded information reading terminal of F1, wherein said encoded information reading terminal is configured so that said encoded information reading terminal exits said unique association mode of operation when reading of a specially encoded programming dataform, wherein said encoded information reading terminal and said specially encoded dataform are complementarily configured so that when said encoded information reading terminal reads said specially encoded programming dataform, said encoded information reading terminal enters a mode of operation in which said encoded information reading terminal can respond to one or more of inquiry and connection requests from external devices. There is also described (F9) The encoded information reading terminal of F1, wherein said unique association mode of operation is further characterized by the encoded information reading terminal being incapable of responding to inquiry requests from external devices for the time that said encoded information reading terminal remains in said unique association mode. There is also described (F10) The encoded information reading terminal of F1, wherein said unique association mode of operation is further characterized by the encoded information reading terminal being incapable of responding to connection requests from external devices for the time that said encoded information reading terminal remains in said unique association mode. There is also described (F11) The encoded information reading terminal of F1, wherein said encoded information reading terminal is configured to operate as one of a master or slave in piconet in which a master manages the allocation of communication time slots of said piconet, and wherein said unique association mode is further characterized by the encoded information reading terminal automatically executing a role switch from master to slave while maintaining a connection to said cash register after connecting to said one computer. There is also described (F12) The encoded information reading terminal of F1, wherein said unique association mode is further characterized by said encoded information reading terminal buffering decoded message data collected by said encoded information reading terminal when out of range of said one computer, and transmitting said buffered decoded bar code data to said one computer utilizing said certain radio address when returning to a location in range of said at least one computer. There is also described (F13) The encoded information reading terminal, of F1, wherein said unique association mode is further characterized by said encoded information reading terminal storing said certain radio address in a non-volatile memory of the encoded information reading terminal so that when encoded information reading terminal loses power and regains power, and receives a trigger signal after regaining power, attempts to connect to said one computer utilizing said certain radio address to transmit decoded message data collected as a result of said receipt of said trigger signal to said one computer. There is also described (F14) The encoded information reading device of F1, wherein said unique association mode is further characterized by said encoded information reading terminal monitoring data transmissions and disconnecting from said one computer if said encoded information reading device is not actuated to send bar code message data to said one computer within a timeout period, the unique association mode further being characterized by said encoded information reading terminal attempting to reconnect to said one computer utilizing said certain radio address if actuated to read a dataform when in a disconnected state. There is also described (F15) The encoded information reading terminal of F1, wherein said terminal examines a device class identifier from said one computer to verify that said radio address is recovered from a certain class or device.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:

1. A bar code reading terminal for use in a retail store network having a plurality of cash registers external to said bar code reading terminal, the bar code reading terminal comprising:
   a bar code reader unit;
   a manual trigger;
   a hand held housing devoid of a display encapsulating at least one component of said bar code reader unit, the housing being configured so that a user can actuate said manual trigger when grasping said housing, the bar code reading terminal being configured so that when said manual trigger is actuated said bar code reader unit produces a decoded bar code data message;
   a radio transceiver encapsulated by said housing;
   wherein said bar code reading terminal is configured to wait for a cash register address to be wirelessly received from one cash register of said plurality of cash registers and to automatically enter a unique association mode of operation subsequent to receiving said cash register address, wherein said one cash register has a certain cash register address and wherein said unique association mode of operation is characterized by the bar code reading terminal for the time that said bar code reading terminal remains in said unique association mode utilizing only said certain cash register address when initiating a network connection for the transmission of decoded out bar code message data to an external device; and
   wherein said unique association mode is further characterized by said bar code reading terminal monitoring data transmissions and disconnecting from said one cash register if said bar code reading terminal is not actuated to send bar code message data to said one cash register within a timeout period, the unique association mode further being characterized by said bar code reading terminal attempting to reconnect to said one cash register utilizing said cash register address if actuated to read a bar code when in a disconnected state.

2. The bar code reading terminal of claim 1, wherein said bar code reading terminal is configured to wirelessly receive said cash register address from said one cash register as part of a connection request initiated by said one cash register.

3. The bar code reading terminal of claim 1, wherein said bar code reading terminal is configured so that said bar code reading terminal wirelessly receives said cash register address when receiving a transmitted Frequency Hop Synchronization packet transmitted by said one cash register.

4. The bar code reading terminal of claim 1, wherein said bar code reading terminal is configured so that said bar code reading terminal enters said unique association mode when a connection request initiated by said one cash register results in a completed connection between said one cash register and said bar code reading terminal.

5. The bar code reading terminal of claim 1, wherein said unique association mode is characterized by said bar code reading terminal automatically attempting to initiate a connection to said one cash register utilizing said cash register address when entering said unique association mode.

6. The bar code reading terminal of claim 1, wherein said bar code reading terminal is configured so that prior to entering said unique association mode said bar code reading terminal is prevented from wirelessly sending decoded bar code message data from said bar code reading terminal.

7. The bar code reading terminal of claim 1, wherein said bar code reading terminal is configured so that said bar code reading terminal exits said unique association mode of operation when reading a specially encoded programming bar code symbol.

8. The bar code reading terminal of claim 1, wherein said bar code reading terminal is configured so that said bar code reading terminal exits said unique association mode of operation when reading of a specially encoded programming bar code symbol, wherein said bar code reading terminal and said specially encoded programming bar code symbol are complementarily configured so that when said bar code reading terminal reads said specially encoded programming symbol, said bar code reading terminal enters a mode of operation in which said bar code reading terminal can respond to inquiry requests from external devices.

9. The bar code reading terminal of claim 1, wherein said unique association mode of operation is further characterized by the bar code reading terminal being incapable of responding to inquiry requests from external devices for the time that said bar code reading terminal remains in said unique association mode.

10. The bar code reading terminal of claim 1, wherein said unique association mode of operation is further characterized by said bar code reading terminal being incapable of responding to connection requests from external devices for the time that said bar code reading terminal remains in said unique association mode.

11. The bar code reading terminal of claim 1, wherein said bar code reading terminal is configured to operate as one of a master or slave in piconet in which a master manages the allocation of communication time slots of said piconet, and wherein said unique association mode is further characterized by the bar code reading terminal automatically executing a role switch from master to slave while maintaining a connection to said one cash register after connecting to said one cash register.

12. The bar code reading terminal of claim 1, wherein said unique association mode is further characterized by said bar code reading terminal buffering decoded bar code data collected by said bar code reading terminal when out of range of said one cash register, and transmitting said buffered decoded bar code data to said one cash register utilizing said certain cash register address when returning to a location in range of said one cash register.

13. The bar code reading terminal, of claim 1, wherein said unique association mode is further characterized by said bar code reading terminal storing said certain cash register address in a non-volatile memory of said bar code reading terminal so that when said bar code reading terminal loses power and regains power, and receives a trigger signal after regaining power attempts to connect to said one cash register utilizing said certain cash register address to transmit decoded out bar code message data collected as a result of said receipt of said trigger signal to said one cash register.

14. A system comprising:
a plurality of cash registers, each having a display;
a bar code reading terminal having bar code reader unit, a manual trigger, a hand held housing devoid of a display encapsulating at least one component of said bar code reader unit, the housing being configured so that a user can actuate said manual trigger when grasping said housing, the bar code reading terminal being configured so that when said manual trigger is actuated said bar code reader unit produces a decoded bar code data message, the bar code reading terminal further including a radio transceiver encapsulated by said housing, wherein said bar code reading terminal is configured to wait for a cash register address to be wirelessly received from one cash register of a plurality of cash registers and to automatically enter a unique association mode of operation subsequent to receiving said cash register address;
wherein said system is configured so that said cash register address waited for by said bar code reading terminal can be sent from said one cash register by commanding said one cash register to (i) display on said display designators for radio equipped devices in range of it so that one of the designators can be selected, the plurality of designators including a designator for said bar code reading terminal; and (ii) send a cash register address of said one cash register to said bar code reading terminal.

15. A system of claim 14, wherein the system is configured so that said cash register address is sent to said bar code reading terminal responsively to an actuation of said designator for said bar code reading terminal.

16. A system of claim 14, wherein said system is configured so that said cash register address is sent to said bar code reading terminal during execution of a connection request.

17. A hand held encoded information reading terminal for use in a network having a plurality of computers external to said encoded information reading terminal, the encoded information reading terminal comprising:
an encoded information reading unit selected from the group consisting of a bar code reader unit, an RFID reader unit, and a card reader unit;
a manual trigger;
a hand held housing devoid of a display encapsulating at least one component of said encoded information reading unit, the hand held encoded information reading terminal being configured so that said encoded information reading unit can produce decoded data messages;
a radio transceiver encapsulated by said hand held housing;
wherein said encoded information reading terminal is configured to wait for a radio address to be wirelessly received by said radio transceiver from one computer of said plurality of computers and to automatically enter a unique association mode of operation subsequent to receiving said radio address, wherein said one computer has a certain radio address and wherein said unique association mode of operation is characterized by the encoded information reading terminal, for the time that said encoded information reading terminal remains in said unique association mode, being incapable of initiating a communication using said radio transceiver with an external device other than said one computer; and
wherein said unique association mode is further characterized by said encoded information reading terminal monitoring data transmissions and disconnecting from said one computer if said encoded information reading device is not actuated to send bar code message data to said one computer within a timeout period, the unique association mode further being characterized by said encoded information reading terminal attempting to reconnect to said one computer utilizing said certain radio address if actuated to read a dataform when in a disconnected state.

18. The encoded information reading terminal of claim 17, wherein said encoded information reading terminal is configured to wirelessly receive a radio address from said one computer as part of a connection request initiated by said one computer.

19. The encoded information reading terminal of claim 17, wherein said encoded information reading terminal is configured so that said encoded information reading terminal wirelessly receives said radio address when receiving a transmitted Frequency Hop Synchronization packet transmitted by said one computer.

20. The encoded information reading terminal of claim 17, wherein said encoded information reading terminal is configured so that said encoded information reading terminal enters said unique association mode when a connection request initiated by said one computer results in a completed connection between said one computer and said encoded information reading terminal.

21. The encoded information reading terminal of claim 17, wherein said unique association mode is characterized by said encoded information reading terminal automatically attempting to initiate a connection to said one computer utilizing said radio address when entering said unique association mode.

22. The encoded information reading terminal of claim 17, wherein said encoded information reading terminal is configured so that prior to entering said unique association mode said encoded information reading terminal is prevented from wirelessly sending decoded message data from said encoded information reading terminal.

23. The encoded information reading terminal of claim 17, wherein said encoded information reading terminal is configured so that said encoded information reading terminal exits said unique association mode of operation when reading a specially encoded programming dataform.

24. The encoded information reading terminal of claim 17, wherein said encoded information reading terminal is configured so that said encoded information reading terminal exits said unique association mode of operation when reading of a specially encoded programming dataform, wherein said encoded information reading terminal and said specially encoded programming dataform are complementarily configured so that when said encoded information reading terminal reads said specially encoded programming dataform, said encoded information reading terminal enters a mode of operation in which said encoded information reading terminal can respond to one or more of inquiry and connection requests from external devices.

25. The encoded information reading terminal of claim 17, wherein said unique association mode of operation is further characterized by the encoded information reading terminal being incapable of responding to inquiry requests from external devices for the time that said encoded information reading terminal remains in said unique association mode.

26. The encoded information reading terminal of claim 17, wherein said unique association mode of operation is further characterized by the encoded information reading terminal being incapable of responding to connection requests from external devices for the time that said encoded information reading terminal remains in said unique association mode.

27. The encoded information reading terminal of claim 17, wherein said encoded information reading terminal is configured to operate as one of a master or slave in piconet in which a master manages the allocation of communication time slots of said piconet, and wherein said unique association mode is further characterized by the encoded information reading terminal automatically executing a role switch from master to slave while maintaining a connection to said one computer after connecting to said one computer.

28. The encoded information reading terminal of claim 17, wherein said unique association mode is further characterized by said encoded information reading terminal buffering decoded message data collected by said encoded information reading terminal when out of range of said one computer, and transmitting said buffered decoded bar code data to said one computer utilizing said certain radio address when returning to a location in range of said one computer.

29. The encoded information reading terminal of claim 17, wherein said unique association mode is further characterized by said encoded information reading terminal storing said certain radio address in a non-volatile memory of the encoded information reading terminal so that when encoded information reading terminal loses power and regains power, and receives a trigger signal after regaining power, attempts to connect to said one computer utilizing said certain radio address to transmit decoded message data collected as a result of said receipt of said trigger signal to said one computer.

30. The encoded information reading terminal of claim 17, wherein said terminal examines a device class identifier from said one computer to verify that said radio address is recovered from a certain class or device.

31. The encoded information reading terminal of claim 30, wherein said terminal is configured to be permitted to enter a unique association mode if the terminal verifies that the device class identifier indicates the certain class.

32. The encoded information reading terminal of claim 30, wherein said terminal is configured to avoid entering a unique association mode if the terminal determines that the device class identifier indicates a class other than the certain class.

33. The encoded information reading terminal of claim 30, wherein said terminal is configured to be permitted to enter a unique association mode if the terminal verifies that the device class identifier indicates a PC.

34. The encoded information reading terminal of claim 30, wherein said terminal is configured to avoid entering a unique association mode if the terminal determines that the device class identifier indicates a class other than a PC.

* * * * *